(No Model.)
M. V. JORDAN & C. O. COLE.
CORN PLANTER.
No. 341,752. Patented May 11, 1886.
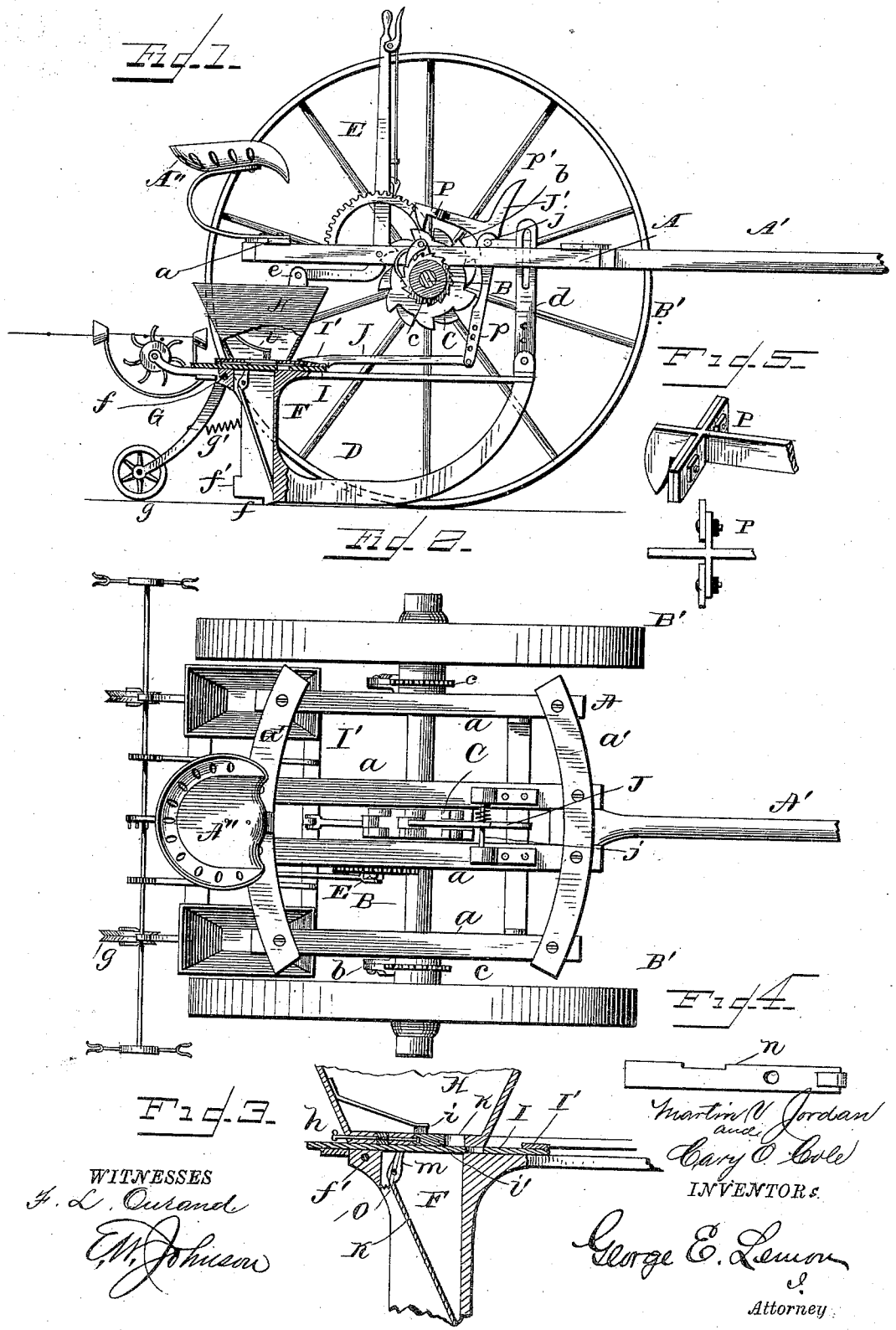
WITNESSES
INVENTORS
Martin V. Jordan and Cary O. Cole
George E. Lemon
Attorney

UNITED STATES PATENT OFFICE.

MARTIN V. JORDAN AND CARY O. COLE, OF LETTS, ASSIGNORS OF ONE-THIRD TO GRANT L. RAMSEY, OF ALGONA, IOWA.

CORN-PLANTER.

SPECIFICATION forming part of Letters Patent No. 341,752, dated May 11, 1886.

Application filed October 5, 1885. Serial No. 179,070. (No model.)

*To all whom it may concern:*

Be it known that we, MARTIN V. JORDAN and CARY O. COLE, citizens of the United States of America, residing at Letts, in the county of Louisa and State of Iowa, have invented certain new and useful Improvements in Corn-Planters; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to certain new and useful improvements in corn or seed planters; and it consists in the improvements hereinafter described and set forth.

In the accompanying drawings, Figure 1 is a side view, partly in section, of a planter constructed in accordance with our invention. Fig. 2 is a plan view. Fig. 3 is a detail sectional view of the seed hopper and spout. Fig. 4 is a plan view of the seed-slide, and Fig. 5 is a detail perspective view of the end of the seed-slide operating-lever.

A represents an upper frame, which consists of a series of longitudinal beams, *a a*, which are connected to each other at their ends by curved metallic braces *a' a'*. The center longitudinal beams, *a a*, have attached at their forward end the draft-tongue A', and at their rear ends the driver's seat A''.

B represents a central axle, which rotates freely in boxes attached to the under sides of the beams *a*, the outer ends of the aforesaid axle being formed into spindles upon which rotate the hub of the supporting-wheels B'. The axle B, just beyond the longitudinal beams *a* of the frame, is provided near each end with collars, which are rigidly attached thereto, said collars having projecting portion *b*, to which are pivoted spring-pawls which engage with ratchet-wheels *c*, attached to the inner sides of the hubs of the wheels, the teeth of the ratchet-wheels being so placed that when the planter is drawn forward the axle will be rotated, and will remain stationary when the wheels are moved in an opposite direction. To the center of the axle, and between the beams *a a*, are located a series of ratchet-disks, C, which are of the same diameter, but are provided on their peripheries with teeth which are located at different distances from each other, so as to provide for dropping the grain or corn at different distances, as will be hereinafter set forth.

D represents the lower frame, which is pivotally attached to depending bars or hangers *d*, which are adjustably connected to the upper frame in front of the axle, and by providing this adjustable connection between the parts the depth which the runners or shoes will enter the ground can be regulated.

The rear portion of the lower frame, between the seed-hoppers, is provided with an upwardly-projecting bar, *e*, to which is pivoted the arm of a crank-lever, E, said crank-lever having a pawl which engages with a toothed segment attached to the upper frame at the right hand of the driver's seat, said crank-lever being for the purpose of raising the rear end of the lower frame, so that it can move freely over obstructions, or for depressing the same, so that the heels of the shoes will enter deeply into the ground.

The seed-spouts F, which are located at the rear ends of the shoes, are preferably open at the back portion, and at their lower ends or heels are cut away, as shown at *f*, so that the grain may freely pass from the same, and they are extended rearwardly at their lower ends, so as to provide rearwardly-projecting portions *f'*, to which are pivotally attached depending arms G, which are curved rearwardly and carry at their lower ends grooved covering-wheels *g*, which move in a line with the heels of the seed-spouts. These arms G are also connected near their central portions to the seed-spouts by springs *g'*, which cause the same to press firmly upon the ground, so as to thoroughly cover the seed, and said springs will allow the aforesaid arms and wheels to rise, so as to move over obstructions without raising the heels of the shoes out of the ground.

The seed-hoppers H are securely attached at their lower sides to the lower frame, immediately above the seed-spouts, and have spouts at their rear and front sides, through which the seed-slides I will pass, and above the slide and to the hopper is attached a brush, *i*, beneath which the seed-slide will reciprocate, said brush removing the surplus seed from the opening in the slide.

The hopper-bottom, as shown in Fig. 3, is provided with an adjustable section, $i'$, for increasing or diminishing the size of the opening therein, and the size of this opening $k$ can be varied by turning the set-screw $h$. The seed-slides I, which reciprocate above the seed-spouts, are connected to each other by one or more transverse bars, $I'$, so that they will move in unison, and to the center portion of the forward bar is attached the operating-bar J, the forward end of which is removably connected to a crank-lever, $J'$, which is pivoted to the main frame so as to contact with the ratchet-disks C.

The bottom of the seed-hopper H, near the rear portion of the seed-spouts, is provided with slots, which are located at one side of the same, through which will pass the upper end, $m$, of a swinging valve, K, pivoted as shown, and its upper end is adapted to engage with the seed-slide I, which is provided with a longitudinal recess, $n$, through which the upper end of the valve K passes. The valve K is provided near its upper end with a spring, $o$, which has a tendency to keep the lower end of the valve K against the seed-spout.

By the construction hereinbefore set forth, when the seed-slide is reciprocated the proper amount of grain will be carried by the opening K therein under the brush $i$, and will fall into the seed-spout, and when said seed-slide is moved forward the notch or recess $n$ therein will engage with the upper end of the pivoted valve K, so as to open the lower end and allow the grain to fall in the furrow made by the shoe.

The angle-bar $J'$, to which is attached the bar J of the seed-dropping mechanism, is pivoted in front of the ratchet-disks, and its depending member $p$ is provided with a series of perforations, in which the end of the bar may be placed, to vary the reciprocation of the seed-slide. The angle-bar $J'$ is supported on a central shaft, $j$, which has end bearings in castings attached to the upper frame, and said shaft is encircled by a spiral spring, the ends of which bear against the upper member, $p'$, of the angle-bar $J'$ and the main frame, so as to have a tendency to throw the member P downwardly and against the ratchet-disks.

The arm P is made in two parts, as shown in Fig. 5, so that the parts can be adjusted one upon the other transversely, so that the end may be placed so as to engage with the different disks. The upper member, $p'$, besides serving as a bearing for the spring, can be used as a foot-lever for throwing the crank-arm $J'$ out of gear.

In connection with the seed-dropping mechanism hereinbefore described, we propose to employ a check-row mechanism, which will be attached to the lower frame and operate in conjunction with the crank-arm $J'$.

We claim—

1. In a corn-planter, an upper frame provided with a central axle to which are attached ratchet-disks, a crank-lever having a horizontal adjustable portion, and pivoted to the frame so as to engage with one of said disks, and having a portion depending below said frame and disks, a bar connecting the same directly with a seed-slide, and a spring for holding the lever against the disks, substantially as shown, and for the purpose described.

2. In a seed-planter, the combination, with the ratchet-wheels C and crank-lever $J'$, having a horizontal adjustable portion, of seed-slide connections, reciprocating slides provided at their sides with notches, the valve K, having upwardly-projecting portion $m$, which engages with said notches, and a spring, $o$, substantially as shown, and for the purpose set forth.

3. In a seed-planter, the rotary axle provided with a series of ratchet-disks rigidly attached thereto, a crank-lever, $J'$, having a depending member, $p$, which is connected to the seed-slide, and a member, P, made in two parts, so that its rear end can be adjusted laterally, so as to engage with either one of the series of ratchet-disks, in combination with seed-planting devices connected to and actuated from the lower end of said depending member, substantially as shown.

In testimony whereof we affix our signatures in presence of two witnesses.

MARTIN V. JORDAN.
CARY O. COLE.

Witnesses:
A. B. CARPENTER,
V. CHAMBERS.